United States Patent
Ohlsson et al.

(10) Patent No.: US 12,219,647 B2
(45) Date of Patent: Feb. 4, 2025

(54) UE IDENTIFIER IN RRC RESUME

(71) Applicant: Telefonaktiebolaget LM Ericsson (publ), Stockholm (SE)

(72) Inventors: Oscar Ohlsson, Bromma (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/141,489

(22) Filed: May 1, 2023

(65) Prior Publication Data
US 2023/0262830 A1   Aug. 17, 2023

Related U.S. Application Data

(63) Continuation of application No. 17/184,520, filed on Feb. 24, 2021, now Pat. No. 11,672,044, which is a
(Continued)

(51) Int. Cl.
| | | |
|---|---|---|
| H04W 12/06 | (2021.01) | |
| H04W 72/21 | (2023.01) | |
| H04W 76/27 | (2018.01) | |

(52) U.S. Cl.
CPC ........... *H04W 76/27* (2018.02); *H04W 12/06* (2013.01); *H04W 72/21* (2023.01)

(58) Field of Classification Search
CPC . H04W 76/27; H04W 72/0413; H04W 12/06; H04W 76/11; H04W 24/04; H04W 24/08
See application file for complete search history.

(56) References Cited

U.S. PATENT DOCUMENTS

| | | |
|---|---|---|
| 10,945,303 B2 | 3/2021 | Ohlsson et al. |
| 2005/0105488 A1 | 5/2005 | Raji et al. |

(Continued)

FOREIGN PATENT DOCUMENTS

| | | |
|---|---|---|
| EP | 2645804 A1 | 10/2013 |
| WO | 2011118997 A2 | 9/2011 |
| WO | 2013144613 A1 | 10/2013 |

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Technical Specification 36.300, Version 13.1.0, Sep. 2015, Chapters 8.1, 8.2, 10.1.6, 3GPP Organizational Partners, 254 pages.
(Continued)

*Primary Examiner* — Anez C Ebrahim
(74) *Attorney, Agent, or Firm* — Withrow & Terranova, PLLC

(57) ABSTRACT

Systems and methods relating to resuming a suspended connection of a wireless device in a wireless system are disclosed. In some embodiments, a method of operation of a wireless device includes receiving, from a wireless network, a first message that indicates to suspend a connection between the wireless device and the wireless network. Responsive to receiving the first message, the wireless devices stores a wireless device context and enters a suspended mode of operation. Upon an occurrence of a triggering event, the wireless device transmits, to the wireless network, a second message that requests to resume the connection between the wireless device and the wireless network, wherein the second message includes a resume identifier having an identifier of a network node and an identifier of the wireless device. The wireless device receives, from the wireless network, a contention resolution
(Continued)

identity Medium Access Control (MAC) control element that includes a portion of the second message.

30 Claims, 6 Drawing Sheets

Related U.S. Application Data continuation of application No. 15/981,461, filed as application No. PCT/IB2016/056867 on Nov. 15, 2016, now Pat. No. 10,945,303.

(60) Provisional application No. 62/256,378, filed on Nov. 17, 2015.

(56) References Cited

U.S. PATENT DOCUMENTS

| | | | |
|---|---|---|---|
| 2009/0312024 A1 | 12/2009 | Chen et al. | |
| 2011/0149756 A1 | 6/2011 | Chan et al. | |
| 2011/0292790 A1 | 12/2011 | Iwamura et al. | |
| 2013/0260810 A1* | 10/2013 | Rayavarapu | H04W 76/19 455/509 |
| 2014/0177607 A1 | 6/2014 | Li et al. | |
| 2014/0301304 A1 | 10/2014 | Kubota et al. | |
| 2015/0230204 A1 | 8/2015 | Lin | |
| 2017/0332419 A1 | 11/2017 | Kim et al. | |
| 2017/0339612 A1 | 11/2017 | Quan et al. | |
| 2018/0249365 A1* | 8/2018 | Cho | H04W 72/12 |
| 2019/0045345 A1 | 2/2019 | Lee et al. | |

OTHER PUBLICATIONS

Author Unknown, "Technical Specification Group Radio Access Network; Evolved Universal Terrestrial Radio Access (E-UTRA); Medium Access Control (MAC) protocol specification (Release 12)," Technical Specification 36.321, Version 12.7.0, Sep. 2015, 3GPP Organizational Partners, 77 pages.
Author Unknown, "Technical Specification Group Radio Access Network; Evolved Universal Terrestrial Radio Access (E-UTRA); Radio Resource Control (RRC); Protocol Specification (Release 12)", Technical Specification 36.331, Version 12.7.0, Sep. 2015, 3GPP Organizational Partners, 453 pages.
Ericsson, "R3-161323: Text proposal on Flexible eNB-ID in E-UTRAN," 3GPP TSG-RAN WG3 Meeting #92, May 23-27, 2016, Nanjing, China, 8 pages.
Huawei, "R3-160644: Open issues in User Plane solution," 3GPP TSG-RAN3 Meeting #91-bis, Apr. 11-15, 2016, Bangalore, India, 4 pages.
Huawei, et al., "R2-163909: Open issues on CIoT optimizations for non-NB-IoT," 3GPP TSG-RAN WG2 Meeting #94, May 23-27, 2016, Nanjing, China, 5 pages.
Intel Corporation, "R2-168520: 2-Step random access procedure in NR," 3GPP TSG-RAN WG2 #96, Nov. 14-18, 2016, Reno, Nevada, 4 pages.
Intel Corporation, "R2-156350: Discussion on user plane solution of AS context reuse for NB-IOT," 3GPP TSG RAN WG2 Meeting #92, Nov. 16-20, 2015, Anaheim, California, 6 pages.
Nokia, et al., "R2-163871: Further details on RA procedure," 3GPP TSG-RAN WG2 Meeting #94, May 23-27, 2016, Nanjing, China, 3 pages.
NTT Docomo, Inc., "R2-156424: Work on user plane based solution with AS information stored in RAN," 3GPP TSG-RAN WG2 #92, Nov. 16-20, 2015, Anaheim, California, 12 pages.
ZTE, et al., "R2-154452: Exception report latency evaluation for NB-IoT," 3GPP TSG-RAN WG2 meeting #91bis, Oct. 5-9, 2015, Malmo, Sweden, 12 pages.
Examination Report for European Patent Application No. 16801591.5, mailed Mar. 9, 2021, 9 pages.
Intention to Grant for European Patent Application No. 16801591.5, mailed Oct. 20, 2021, 5 pages.
Extended European Search Report for European Patent Application No. 21209383.5, mailed Mar. 9, 2022, 10 pages.
Office Action for Korean Patent Application No. 10-2018-7016959, mailed Mar. 5, 2019, 15 pages.
Office Action for Korean Patent Application No. 10-2018-7016959, mailed Oct. 23, 2019, 4 pages.
International Search Report and Written Opinion for International Patent Application No. PCT/IB2016/056867, mailed Feb. 1, 2017, 18 pages.
Non-Final Office Action for U.S. Appl. No. 15/981,461, mailed Jul. 5, 2019, 18 pages.
Final Office Action for U.S. Appl. No. 15/981,461, mailed Feb. 21, 2020, 19 pages.
Advisory Action for U.S. Appl. No. 15/981,461, mailed May 26, 2020, 3 pages.
Non-Final Office Action for U.S. Appl. No. 15/981,461, mailed Aug. 24, 2020, 15 pages.
Notice of Allowance for U.S. Appl. No. 15/981,461, mailed Dec. 14, 2020, 7 pages.
Non-Final Office Action for U.S. Appl. No. 17/184,520, mailed Apr. 14, 2022, 15 pages.
Final Office Action for U.S. Appl. No. 17/184,520, mailed Oct. 6, 2022, 16 pages.
Notice of Allowance for U.S. Appl. No. 17/184,520, mailed Jan. 31, 2023, 8 pages.
Author Unknown, "Technical Specification Group Services and System Aspects; Architecture enhancements for Cellular Internet of Things (Release 13)," Technical Report 23.720, V1.1.0, Oct. 2015, 3GPP Organizational Partners, 90 pages.

* cited by examiner

UE IDENTIFIER IN RRC RESUME

RELATED APPLICATIONS

This application is a continuation of U.S. application Ser. No. 17/184,520, filed Feb. 24, 2021, now U.S. Pat. No. 11,672,044, which is a continuation of U.S. application Ser. No. 15/981,461, filed May 16, 2018, now U.S. Pat. No. 10,945,303, which is a 35 U.S.C. § 371 national phase filing of International Application No. PCT/IB2016/056867, filed Nov. 15, 2016, which claims the benefit of U.S. Provisional Application No. 62/256,378, filed Nov. 17, 2015, the disclosures of which are fully incorporated herein by reference.

TECHNICAL FIELD

The present disclosure relates to a Radio Resource Control (RRC) resume procedure in a cellular communications network.

BACKGROUND

Cellular communication systems are currently being developed and improved for Machine Type Communication (MTC), communication characterized by lower demands on data rates than for example mobile broadband, but with higher requirements on, e.g., low cost device design, better coverage, and ability to operate for years on batteries without charging or replacing the batteries. One of the main characteristics of MTC is infrequent transmission of small amounts of data. It is expected that the number of MTC devices will increase exponentially but the data size per device will remain small. In Third Generation Partnership Project (3GPP) Long Term Evolution (LTE), the current data transfer procedures are not optimized for small data transfers and short lived sessions, which results in a large signaling overhead.

To handle small data transfers more efficiently, 3GPP has studied methods to reduce the signaling overhead when transitioning from Radio Resource Control (RRC) IDLE to RRC CONNECTED. One of the chosen solutions is "RRC resume," which is based on re-using the User Equipment (UE) context from the previous RRC connection for the subsequent RRC connection setup. By storing the UE context in the enhanced or evolved Node B (eNB), one can avoid the signaling required for security activation and bearer establishment at the next RRC IDLE to RRC CONNECTED transition. Although the term "UE" is used throughout this document, "Wireless Device" or "WD" may be used interchangeably. It will be understood that the UEs/WDs as described herein are not limited to mobile phones, but may extend to any fixed or mobile device with a wireless connection that performs MTC. Likewise, although the term "eNB" is used herein, "eNB" or "base station" may be used interchangeably and may more generally be referred to as types of radio access nodes.

RRC resume is realized by introducing two new procedures: RRC Suspend and RRC Resume. The eNB suspends a connection by sending a RRC Connection Suspend (also referred to herein as an RRC Connection Suspend message) to the UE. This may happen, for example, after the UE has been inactive for a certain period of time, as shown in FIG. 1. Note that, in 3GPP Release 13, RRC Connection Suspend is signaled with an RRCConnectionRelease message with releaseCause set to "rrc-Suspend." Both the UE and eNB store the UE context and an associated identifier (ID), which is referred to herein as Resume ID. The UE context contains, e.g., bearer configuration and security related parameters. In 3GPP Release 13, the RRC Connection Suspend message contains the Resume ID, but does not contain security parameters. However, in future releases, in addition to the Resume ID, it may be possible for the RRC Connection Suspend message to also contain security related parameters (Next hop Chaining Counter (NCC) and integrity and ciphering algorithms) which are required when Access Stratum (AS) security is later re-established.

At the next transition from RRC IDLE to RRC CONNECTED, the UE resumes the connection by sending a RRC Connection Resume Request (also referred to herein as a RRC Connection Resume Request message) to the eNB, as shown in FIG. 2. The RRC Connection Resume Request message contains the previously received Resume ID, which the eNB uses to retrieve the UE context. An authorization token is also provided to allow the eNB to securely identify the UE. The authorization token may also be referred to as an authentication token. Assuming that the UE context is found and the authorization token is valid, the eNB responds with a RRC Connection Resume (also referred to herein as a RRC Connection Resume message) to confirm that the connection is being resumed. The UE acknowledges the reception by sending a RRC Connection Resume Complete (also referred to herein as a RRC Connection Resume Complete message).

Note that the messages RRC Connection Suspend, RRC Connection Resume Request, RRC Connection Resume, and RRC Connection Resume Complete should be seen as placeholders that describe their functionality; their names may differ in the final specification of RRC resume.

RRC resume is not necessarily limited to a single cell or single eNB, but can also be supported across eNBs. Inter-eNB connection resumption is handled using context fetching, whereby the resuming eNB retrieves the UE context from the suspending eNB over the X2 interface. The resuming eNB provides the Resume ID, which is used by the suspending eNB to identify the UE context.

One problem that arises with RRC resume supporting inter-eNB connection resumption is that the resuming eNB must retrieve the UE context from the suspending eNB. Thus, there is a need for systems and methods that enable the resuming eNB to quickly and efficiently identify the suspending eNB such that the UE context can be retrieved.

SUMMARY

Systems and methods relating to resuming a suspended connection of a wireless device in a wireless system are disclosed. In some embodiments, a method of operation of a wireless device in a wireless system comprises receiving, from a first network node, a first message that instructs the wireless device to suspend a connection between the wireless device and the wireless system where, upon receiving the first message, the wireless device stores a wireless device context of the wireless device and enters a suspended mode of operation. The method further comprises, upon an occurrence of a triggering event, transmitting, to a second network node, a second message that requests that the connection between the wireless device and the wireless system be resumed. The second message comprises a resume identifier, and the resume identifier comprises a part that identifies the first network node to which the wireless device was connected upon suspending the connection and a part that identifies the wireless device. The method further comprises receiving, from the second network node, a third message that indicates that the connection between the wireless device and the wireless system is being resumed using the stored wireless device context of the wireless device. The use of the resume identifier that includes the part that identifies the first network node and the part that identifies the wireless device enables the second network node to obtain the context of the wireless device from the first network node. This is particularly beneficial in scenarios in which the first and second network nodes are different network nodes.

In some embodiments, the wireless system is a Long Term Evolution (LTE) network, the part of the resume identifier that identifies the first network node is an Evolved Universal Terrestrial Radio Access Network (E-UTRAN) Cell Identifier (ID) (ECI), and the part of the resume identifier that identifies the wireless device is a Cell Radio Network Temporary ID (C-RNTI).

In some embodiments, an ordering of the parts within the resume identifier is such that the part of the resume identifier that identifies the first network node occurs first in the ordering and the part of the resume identifier that identifies the wireless device occurs after the part of the resume identifier that identifies the first network node in the ordering. In some other embodiments, an ordering of the parts within the resume identifier is such that the part of the resume identifier that identifies the wireless device occurs first in the ordering and the part of the resume identifier that identifies the first network node occurs after the part of the resume identifier that identifies the wireless device in the ordering.

In some embodiments, the resume identifier further comprises a part that contains a group identifier assigned to the wireless device. Further, in some embodiments, an ordering of the parts within the resume identifier is such that the part of the resume identifier that identifies the wireless device occurs first in the ordering, the part that contains the group identifier assigned to the wireless device occurs after the part of the resume identifier that identifies the wireless device in the ordering, and the part of the resume identifier that identifies the first network node occurs after the part that contains the group identifier assigned to the wireless device in the ordering. Further, in some embodiments, bit orders within the parts of the resume identifier are reversed.

In some embodiments, the third message that indicates that the connection between the wireless device and the wireless system is being resumed comprises a copy of the second message that requests that the connection between the wireless device and the wireless system be resumed.

In some embodiments, a Medium Access Control (MAC) control element associated with the third message comprises a copy of the second message that requests that the connection between the wireless device and the wireless system be resumed.

In some embodiments, a MAC control element associated with the third message comprises a copy of a portion of the second message that requests that the connection between the wireless device and the wireless system be resumed. Further, in some embodiments, the portion of the second message comprises the part of the resume identifier that identifies the wireless device. In some embodiments, the second message further comprises an authorization token that allows the second network node to securely identify the wireless device, and the portion of the second message comprises the authorization token. In some embodiments, the resume identifier further comprises a part that contains a group identifier assigned to the wireless device, and the portion of the second message comprises the part of the resume identifier that contains the group identifier. In some embodiments, the second message is transmitted in an uplink common control channel service data unit, and the portion of the second message is provided by truncating the uplink common control channel service data unit. In some embodiments, the second message is transmitted in an uplink common control channel service data unit, and the portion of the second message is provided by truncating the uplink common control channel service data unit to a size of an existing contention resolution identity MAC control element in LTE. In some embodiments, the second message is transmitted in an uplink common control channel service data unit, and the portion of the second message is provided by truncating the uplink common control channel service data unit to 48 bits.

In some embodiments, the wireless device context comprises a bearer configuration of the wireless device and security related parameters.

In some embodiments, the first network node and the second network node are different network nodes. In some other embodiments, the first network node and the second network node are the same network node.

Embodiments of a wireless device are also disclosed. In some embodiments, a wireless device for a wireless system comprises an interface operable to provide wireless communication between the wireless device and one or more network nodes, a processor, and storage comprising instructions executable by the processor whereby the wireless device is operable to operate as follows. The wireless device is operable to receive, from a first network node via the interface, a first message that instructs the wireless device to suspend a connection between the wireless device and the wireless system. Upon receiving the first message, the wireless device stores a wireless device context of the wireless device and enters a suspended mode of operation. The wireless device is further operable to, upon an occurrence of a triggering event, transmit, to a second network node via the interface, a second message that requests that the connection between the wireless device and the wireless system be resumed. The second message comprises a resume identifier, and the resume identifier comprises a part that identifies the first network node to which the wireless device was connected upon suspending the connection, and a part that identifies the wireless device. The wireless device is further operable to receive, from the second network node via the interface, a third message that indicates that the connection between the wireless device and the wireless system is being resumed using the stored wireless device context of the wireless device.

In some embodiments, a wireless device for a wireless system is adapted to receive, from a first network node, a first message that instructs the wireless device to suspend a connection between the wireless device and the wireless system where, upon receiving the first message, the wireless device stores a wireless device context of the wireless device and enters a suspended mode of operation. The wireless device is further adapted to, upon an occurrence of a triggering event, transmit, to a second network node, a second message that requests that the connection between the wireless device and the wireless system be resumed. The second message comprises a resume identifier, and the resume identifier comprises a part that identifies the first network node to which the wireless device was connected upon suspending the connection and a part that identifies the wireless device. The wireless device is further adapted to receive, from the second network node, a third message that indicates that the connection between the wireless device and the wireless system is being resumed using the stored wireless device context of the wireless device. In some embodiments, the wireless device is further adapted to operate according to any one of the embodiments of the method of operation of the wireless device described herein.

In some embodiments, a wireless device for a wireless system comprises a first receiving module, a transmitting module, and a second receiving module. The first receiving module is operable to receive, from a first network node, a first message that instructs the wireless device to suspend a connection between the wireless device and the wireless system where, upon receiving the first message, the wireless device stores a wireless device context of the wireless device and enters a suspended mode of operation. The transmitting module is operable to, upon an occurrence of a triggering event, transmit, to a second network node, a second message that requests that the connection between the wireless device and the wireless system be resumed. The second message comprises a resume identifier, and the resume identifier comprises a part that identifies the first network node to which the wireless device was connected upon suspending the connection and a part that identifies the wireless device. The second receiving module is operable to receive, from the second network node, a third message that indicates that the connection between the wireless device and the wireless system is being resumed using the stored wireless device context of the wireless device.

Embodiments of a method of operation of a network node in a wireless system are also disclosed. In some embodiments, a method of operation of a network node in a wireless system comprises receiving, from a wireless device, a first message that requests that a connection between the wireless device and the wireless system be resumed. The first message comprises a resume identifier, and the resume identifier comprises a part that identifies a network node to which the wireless device was connected upon suspending the connection and a part that identifies the wireless device. The method further comprises obtaining, from the network node identified by the resume identifier, a wireless device context of the wireless device previously stored upon suspending the connection between the wireless device and the wireless system. The method further comprises transmitting, to the wireless device, a second message that indicates that the connection between the wireless device and the wireless system is being resumed using the stored wireless device context of the wireless device.

In some embodiments, the network node is a first network node and the network node identified by the resume identifier is a second network node where the first network node and the second network node are different network nodes. Further, in some embodiments, obtaining the wireless device context of the wireless device comprises sending a request for the wireless device context of the wireless device to the second network node and receiving the wireless device context of the wireless device from the second network node. Further, in some embodiments, the request for the wireless device context of the wireless device comprises the resume identifier.

In some embodiments, the second message comprises an authorization token that allows the network node to securely identify the wireless device, and the method further comprises verifying the authorization token.

In some embodiments, the network node and the network node identified by the resume identifier are the same network node, and obtaining the wireless device context of the wireless device comprises obtaining the wireless device context of the wireless device from storage.

In some embodiments, the wireless system is a LTE network, the part of the resume identifier that identifies the network node to which the wireless device was connected upon suspending the connection is an ECI, and the part of the resume identifier that identifies the wireless device is a C-RNTI.

In some embodiments, an ordering of the parts within the resume identifier is such that the part of the resume identifier that identifies the network node to which the wireless device was connected upon suspending the connection occurs first in the ordering and the part of the resume identifier that identifies the wireless device occurs after the part of the resume identifier that identifies the network node to which the wireless device was connected upon suspending the connection in the ordering.

In some embodiments, an ordering of the parts within the resume identifier is such that the part of the resume identifier that identifies the wireless device occurs first in the ordering and the part of the resume identifier that identifies the network node to which the wireless device was connected upon suspending the connection occurs after the part of the resume identifier that identifies the wireless device in the ordering.

In some embodiments, the resume identifier further comprises a part that contains a group identifier assigned to the wireless device. Further, in some embodiments, an ordering of the parts within the resume identifier is such that the part of the resume identifier that identifies the wireless device occurs first in the ordering, the part that contains the group identifier assigned to the wireless device occurs after the part of the resume identifier that identifies the wireless device in the ordering, and the part of the resume identifier that identifies the network node to which the wireless device was connected upon suspending the connection occurs after the part that contains the group identifier assigned to the wireless device in the ordering. In some embodiments, bit orders within the parts of the resume identifier are reversed.

In some embodiments, the second message that indicates that the connection between the wireless device and the wireless system is being resumed comprises a copy of the first message that requests that the connection between the wireless device and the wireless system be resumed.

In some embodiments, a MAC control element associated with the second message comprises a copy of the first message that requests that the connection between the wireless device and the wireless system be resumed.

In some embodiments, a MAC control element associated with the second message comprises a copy of a portion of the first message that requests that the connection between the wireless device and the wireless system be resumed. Further, in some embodiments, the portion of the first message comprises the part of the resume identifier that identifies the wireless device. In some embodiments, the first message further comprises an authorization token that allows the network node to securely identify the wireless device, and the portion of the first message comprises the authorization token. In some embodiments, the resume identifier further comprises a part that contains a group identifier assigned to the wireless device, and the portion of the first message comprises the part of the resume identifier that contains the group identifier. In some embodiments, the first message is transmitted in an uplink common control channel service data unit, and the portion of the first message is provided by truncating the uplink common control channel service data unit. In some embodiments, the first message is transmitted in an uplink common control channel service data unit, and the portion of the first message is provided by truncating the uplink common control channel service data unit to a size of an existing contention resolution identity MAC control element in LTE. In some embodiments, the first message is transmitted in an uplink common control channel service data unit, and the portion of the first message is provided by truncating the uplink common control channel service data unit to 48 bits.

In some embodiments, the wireless device context comprises a bearer configuration of the wireless device and security related parameters.

In some embodiments, the network node is a first network node and the network node identified by the resume identifier is a second network node where the first network node and the second network node are different network nodes.

In some embodiments, the network node and the network node identified by the resume identifier are the same network node.

Embodiments of a network node for a wireless system are also disclosed. In some embodiments, a network node comprises an interface, a processor, and storage comprising instructions executable by the processor whereby the network node is operable to operate as follows. The network node is operable to receive, from a wireless device via the interface, a first message that requests that a connection between the wireless device and the wireless system be resumed. The first message comprises a resume identifier, and the resume identifier comprises a part that identifies a network node to which the wireless device was connected upon suspending the connection and a part that identifies the wireless device. The network node is further operable to obtain, from the network node identified by the resume identifier, a wireless device context of the wireless device previously stored upon suspending the connection between the wireless device and the wireless system. The network node is further operable to transmit, to the wireless device via the interface, a second message that indicates that the connection between the wireless device and the wireless system is being resumed using the stored wireless device context of the wireless device.

In some embodiments, a network node for a wireless system is adapted to receive, from a wireless device, a first message that requests that a connection between the wireless device and the wireless system be resumed. The first message comprises a resume identifier, and the resume identifier comprises a part that identifies a network node to which the wireless device was connected upon suspending the connection and a part that identifies the wireless device. The network node is further adapted to obtain, from the network node identified by the resume identifier, a wireless device context of the wireless device previously stored upon suspending the connection between the wireless device and the wireless system. The network node is further adapted to transmit, to the wireless device, a second message that indicates that the connection between the wireless device and the wireless system is being resumed using the stored wireless device context of the wireless device. In some embodiments, the network node is further adapted to operate according to the method of operation of a network node according to any one of the embodiments describe herein.

In some embodiments, a network node for a wireless system comprises a receiving module, an obtaining module, and a transmitting module. The receiving module is operable to receive, from a wireless device, a first message that requests that a connection between the wireless device and the wireless system be resumed. The first message comprises a resume identifier, and the resume identifier comprises a part that identifies a network node to which the wireless device was connected upon suspending the connection and a part that identifies the wireless device. The obtaining module is operable to obtain, from the network node identified by the resume identifier, a wireless device context of the wireless device previously stored upon suspending the connection between the wireless device and the wireless system. The transmitting module is operable to transmit, to the wireless device, a second message that indicates that the connection between the wireless device and the wireless system is being resumed using the stored wireless device context of the wireless device.

In some embodiments, a method of operation of a wireless device in a wireless system comprises receiving, from a first network node, a first message that instructs the wireless device to suspend a connection between the wireless device and the wireless system where, upon receiving the first message, the wireless device stores a wireless device context of the wireless device and enters a suspended mode of operation. The method further comprises, upon an occurrence of a triggering event, transmitting, to a second network node, a second message that requests that the connection between the wireless device and the wireless system be resumed, the second message comprising a resume identifier. The method further comprises receiving, from the second network node, a third message that indicates that the connection between the wireless device and the wireless system is being resumed using the stored wireless device context of the wireless device. A MAC control element associated with the third message comprises a copy of a portion of the second message that requests that the connection between the wireless device and the wireless system be resumed. Further, the second message is transmitted in an uplink common control channel service data unit, and the portion of the second message is a truncated version of the uplink common control channel service data unit.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
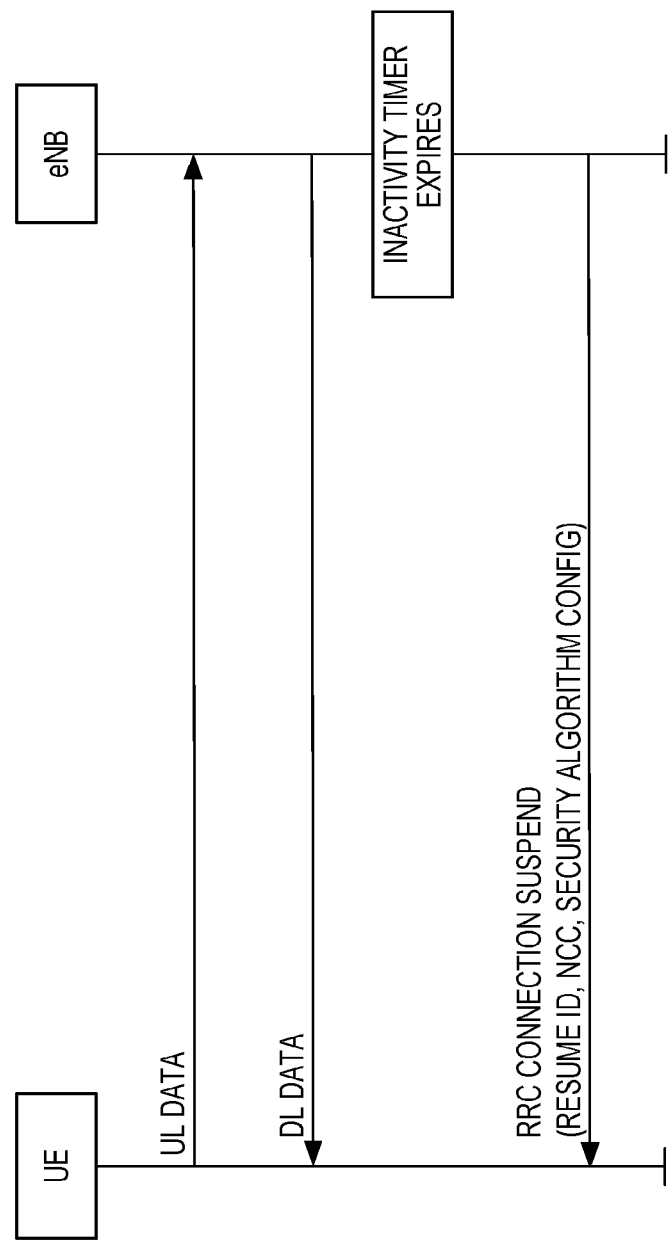
FIG. 1 illustrates a process by which a Radio Resource Control (RRC) connection of a User Equipment device (UE) is suspended.
Figure 2:
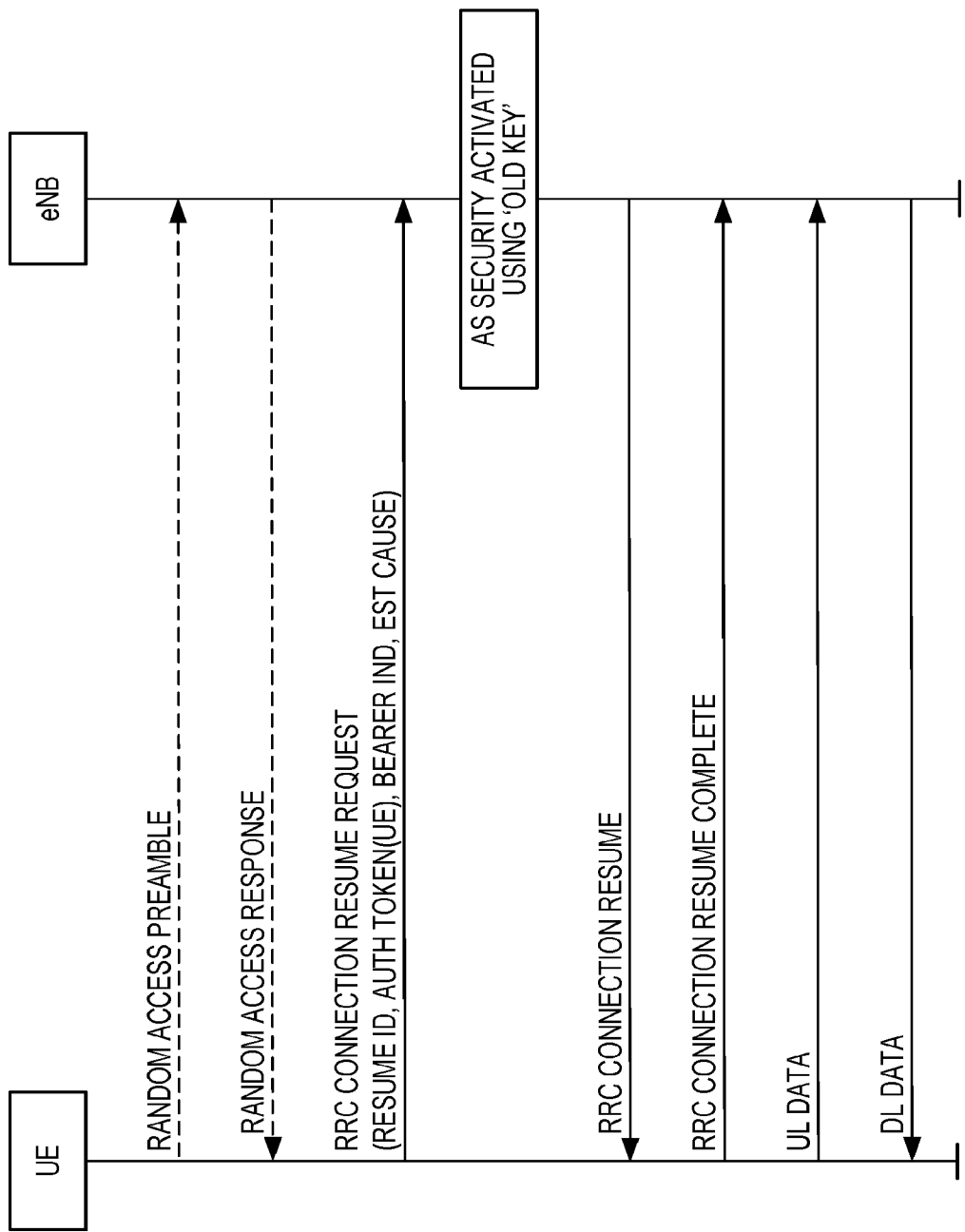
FIG. 2 illustrates a process by which a suspended RRC connection of a UE is resumed.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

As discussed above, Radio Resource Control (RRC) Resume is a feature that reduces signaling overhead when a User Equipment (UE) transitions from RRC IDLE to RRC CONNECTED. RRC Resume is particularly beneficial for UEs, such as Machine Type Communication (MTC) devices, that perform infrequent transmissions of small amounts of data, but is not limited thereto. RRC Resume is based on re-using a UE context from the previous RRC connection for the UE when setting up a subsequent RRC connection for that UE. By storing the UE context in the enhanced or evolved Node B (eNB) to which the UE was connected when the UE's RRC connection was suspended (i.e., the suspending eNB), the UE context can be re-used when resuming the UE's RRC connection, thereby reducing signaling overhead.

One problem with RRC Resume when supporting inter-eNB connection resumption is that the resuming eNB (i.e., the eNB to which the UE is connecting when resuming the RRC connection) must fetch the UE context of the UE from the suspending eNB. A Resume identifier (ID) is associated with the UE for RRC Resume. The Resume ID enables the UE to be identified. The present disclosure relates to systems and methods that utilize a format for the Resume ID that identifies both the UE and the suspending eNB.

More specifically, the format of Resume ID for RRC Resume is still unspecified. As proposed in this disclosure, the Resume ID should first of all act as an identifier for the UE context of suspended UEs. This puts requirements on its length since it has to be large enough to address all the suspended UEs within a cell/eNB. Secondly, it is proposed that in order to support inter-eNB RRC resume, the Resume ID should allow the resuming eNB to identify the eNB which suspended the connection so that the UE context can be fetched. Furthermore, this disclosure proposes that the Resume ID should preferably be based on existing Long Term Evolution (LTE) identifiers to reduce signaling overhead.

Embodiments of a system and method for identifying and retrieving the UE context of a suspended UE when an RRC connection is resumed are disclosed. The identifier for the UE context, i.e., the so called Resume ID, is made up of two parts, where the first part identifies the eNB and cell and the second part identifies the suspended UE within a cell. As will be appreciated by one of skill in the art, the first part of the Resume ID may identify the eNB, the cell, or both the eNB and the cell, depending on the particular implementation. This enables the use of RRC Resume, which is an important signaling reduction technique in LTE.

According to particular embodiments, the first part of the Resume ID is the 28 bit Evolved Universal Terrestrial Radio Access Network (E-UTRAN) Cell ID (ECI) broadcasted in System Information Block (SIB) SIB1, and the second part of the Resume ID is the 16 bit Cell Radio Network Temporary Identifier (C-RNTI) assigned to the UE as part of the random access procedure. Note that C-RNTI is only one example of a network assigned UE identifier. Further note that, as will be understood by one of skill in the art, the ECI includes both the eNB ID and the UE ID and, as such, the first part of the Resume ID may include only the portion of the ECI, or cell ID, that identifies the eNB, in some embodiments. According to alternative embodiments, and to increase likeliness for no more than one UE using the same identifier when a truncated version of the Resume ID is used during contention resolution, the two parts can be swapped such that UE identity within a cell is the first part of the Resume ID and the eNB and cell identifier is the second part of the Resume ID. Together these two identifiers allow a suspended UE to be uniquely identified within a radio access network. Furthermore, since both identifiers are already known to the UE, there is no need to signal the Resume ID to the UE when the RRC connection is suspended.

The 16-bit C-RNTI allows up to 65,536 UEs to be suspended in a cell before the address space is depleted. Since this this may not be enough for wide area cells containing many UEs, a group identifier can optionally be appended to the C-RNTI to increase the address space. The group identifier can be signaled to the UE either in the initial establishment of the RRC connection and when the RRC connection is resumed or when the RRC connection is suspended.

The proposed solutions have the following advantages:
Enables the use of RRC Resume across multiple eNBs/cells.
Since the Resume ID is based on existing identifiers which are already known to the UE, there is no need to signal the Resume ID to the UE when a connection is suspended. This leads to a simpler solution and reduces signaling overhead. Furthermore, using existing identifiers also has the benefit that it requires less specification effort.
By using the optional group identifier, a larger number of suspended UEs can be supported. This is important for wide area cells and/or dense UE deployments.
In some embodiments, ambiguity (in contention resolution due to a new identifier) is avoided for legacy UEs which do not implement or understand the new functionality; i.e., legacy UEs can be kept unaffected.

Figure 3:
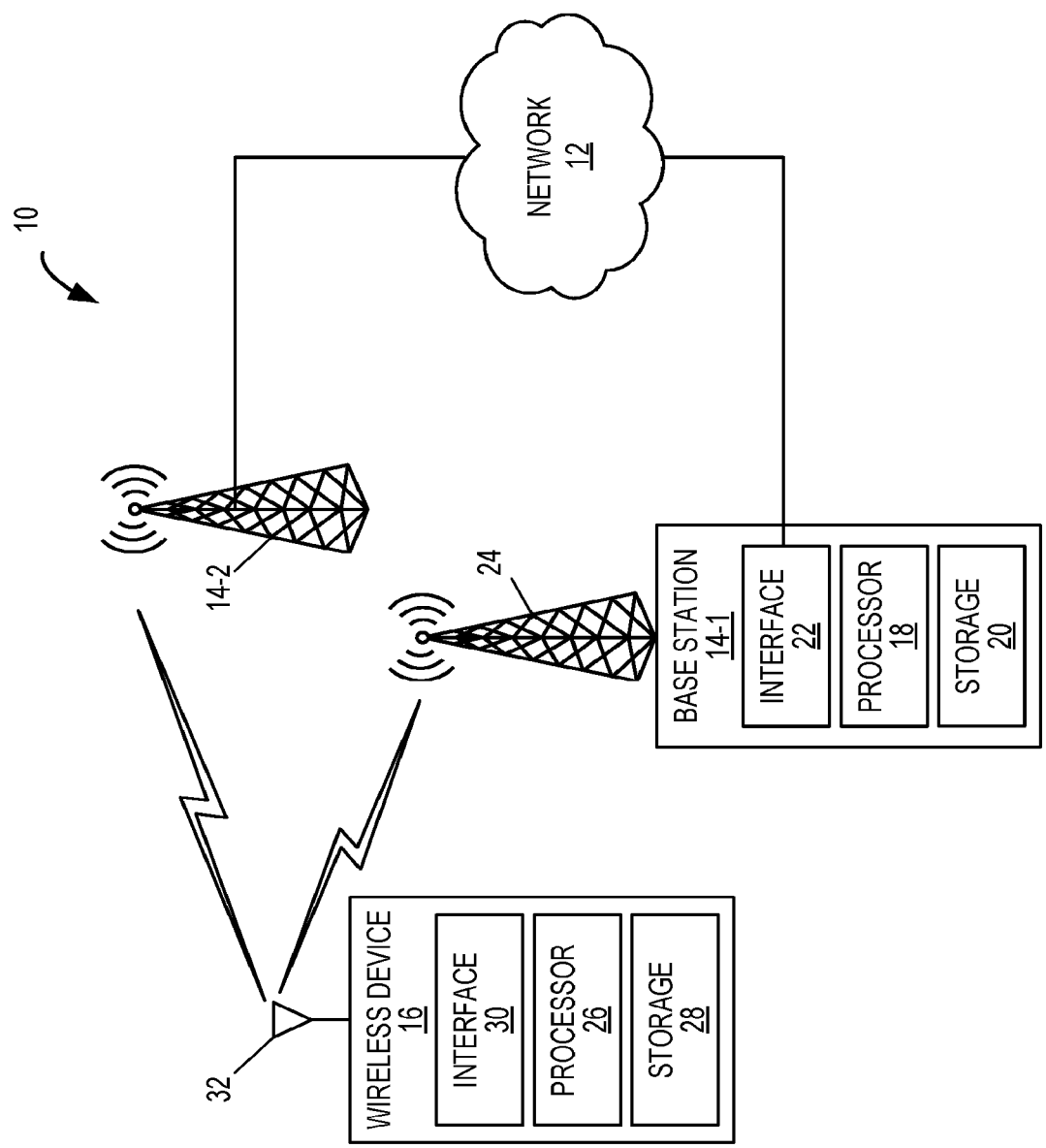
FIG. 3 illustrates one example of a wireless network in which embodiments of the present disclosure may be implemented.

As described above, this disclosure proposes improved methods of RRC Resume for use within a wireless network, especially operating across multiple eNBs/cells in said network. FIG. 3 illustrates an exemplary wireless network 10 in which these embodiments may be carried out, comprising a network 12 which may also be referred to a core network, network nodes 14-1 and 14-2 which may generally be referred to herein as network nodes 14, and a wireless device (WD) 16. In the illustrated example, the network nodes 14 are, more specifically, radio access nodes and, in this example, base stations. As such, the network nodes 14 are also referred to herein as base stations 14. In LTE, base stations are referred to as eNBs. So, the network nodes 14 are also referred to herein as eNBs 14. FIG. 3 comprises more detailed views of the network node 14-1 and the WD 16, in accordance with a particular embodiment. The network node 14-1 comprises a processor 18, storage 20, an interface 22, and an antenna 24. Similarly, the WD 16 comprises a processor 26, storage 28, an interface 30, and an antenna 32. These components may work together in order to provide network node and/or wireless device functionality, such as providing wireless connections in the wireless network 10. In different embodiments, the wireless network 10 may comprise any number of wired or wireless networks, network nodes, base stations, controllers, wireless devices, relay stations, and/or any other components that may facilitate or participate in the communication of data and/or signals whether via wired or wireless connections.

The network 12 may comprise one or more Internet Protocol (IP) networks, Public Switched Telephone Networks (PSTNs), packet data networks, optical networks, Wide Area Networks (WANs), Local Area Networks (LANs), Wireless Local Area Networks (WLANs), wired networks, wireless networks, metropolitan area networks, and other networks to enable communication between devices.

The network node 14-1 comprises the processor 18, the storage 20, the interface 22, and the antenna 24. For the purposes of illustration, these components are depicted as single boxes located within a single larger box. In practice however, a network node may comprise multiple different physical components that make up a single illustrated component (e.g., the interface 22 may comprise terminals for coupling wires for a wired connection and a radio transceiver for a wireless connection). Similarly, the network node 14-1 may be composed of multiple physically separate components (e.g., a Node B component and a Radio Network Controller (RNC) component, a Base Transceiver Station (BTS) component and a Base Station Controller (BSC) component, etc.), which may each have their own respective processor, storage, and interface components. In certain scenarios in which the network node 14-1 comprises multiple separate components (e.g., BTS and BSC components), one or more of the separate components may be shared among several network nodes. For example, a single RNC may control multiple Node Bs. In such a scenario, each unique Node B and BSC pair may be a separate network node. In some embodiments, the network node 14-1 may be configured to support multiple Radio Access Technologies (RATs). In such embodiments, some components may be duplicated (e.g., separate storage 20 for the different RATs) and some components may be reused (e.g., the same antenna 24 may be shared by the RATs).

The processor 18 may be a combination of one or more of a microprocessor, controller, microcontroller, Central Processing Unit (CPU), digital signal processor, Application Specific Integrated Circuit (ASIC), Field Programmable Gate Array (FPGA), or any other suitable computing device, resource, or combination of hardware, software, and/or encoded logic operable to provide, either alone or in conjunction with, other network node 14-1 components, such as storage 20, and network node 14-1 functionality. For example, the processor 18 may execute instructions stored in the storage 20. Such functionality may include providing various wireless features discussed herein to a wireless device, such as the WD 16, including any of the features or benefits disclosed herein.

The storage 20 may comprise any form of volatile or non-volatile computer readable memory including, without limitation, persistent storage, solid state memory, remotely mounted memory, magnetic media, optical media, Random Access Memory (RAM), Read-Only Memory (ROM), removable media, or any other suitable local or remote memory component. The storage 20 may store any suitable instructions, data, or information, including software and encoded logic, utilized by the network node 14-1. The storage 20 may be used to store any calculations made by the processor 18 and/or any data received via the interface 22.

The network node 14-1 also comprises the interface 22 which may be used in the wired or wireless communication of signaling and/or data between the network node 14-1, the network 12, and/or the WD 16. For example, the interface 22 may perform any formatting, coding, or translating that may be needed to allow the network node 14-1 to send and receive data from the network 12 over a wired connection.

The interface 22 may also include a radio transmitter and/or receiver that may be coupled to or a part of the antenna 24. The radio may receive digital data that is to be sent out to other network nodes or WDs via a wireless connection. The radio may convert the digital data into a radio signal having the appropriate channel and bandwidth parameters. The radio signal may then be transmitted via the antenna 24 to the appropriate recipient (e.g., the WD 16).

The antenna 24 may be any type of antenna capable of transmitting and receiving data and/or signals wirelessly. In some embodiments, the antenna 24 may comprise one or more omni-directional, sector, or panel antennas operable to transmit/receive radio signals. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

The WD 16 may be any type of wireless endpoint, wireless machine, mobile station, mobile phone, wireless local loop phone, smartphone, UE, desktop computer, Personal Digital Assistant (PDA), cell phone, tablet, laptop, or Voice over IP (VoIP) phone or handset, which is able to wirelessly send and receive data and/or signals to and from a network node, such as the network node 14-1, and/or other WDs. The WD 16 comprises the processor 26, the storage 28, the interface 30, and the antenna 32. Like the network node 14-1, the components of the WD 16 are depicted as single boxes located within a single larger box; however, in practice a wireless device may comprises multiple different physical components that make up a single illustrated component (e.g., the storage 28 may comprise multiple discrete microchips, each microchip representing a portion of the total storage capacity).

The processor 26 may be a combination of one or more of a microprocessor, controller, microcontroller, CPU, digital signal processor, ASIC, FPGA, or any other suitable computing device, resource, or combination of hardware, software, and/or encoded logic operable to provide, either alone or in combination with other WD 16 components, such as the storage 28, WD 16 functionality. Such functionality may include providing various wireless features discussed herein, including any of the features or benefits disclosed herein.

The storage 28 may be any form of volatile or non-volatile memory including, without limitation, persistent storage, solid state memory, remotely mounted memory, magnetic media, optical media, RAM, ROM, removable media, or any other suitable local or remote memory component. The storage 28 may store any suitable data, instructions, or information, including software and encoded logic, utilized by the WD 16. The storage 28 may be used to store any calculations made by the processor 26 and/or any data received via the interface 30.

The interface 30 may be used in the wireless communication of signaling and/or data between the WD 16 and the network node 14-1. For example, the interface 30 may perform any formatting, coding, or translating that may be needed to allow the WD 16 to send and receive data from the network node 14-1 over a wireless connection. The interface 30 may also include a radio transmitter and/or receiver that may be coupled to or a part of the antenna 32. The radio may receive digital data that is to be sent out to the network node 14-1 via a wireless connection. The radio may convert the digital data into a radio signal having the appropriate channel and bandwidth parameters. The radio signal may then be transmitted via the antenna 32, to the network node 14-1.

The antenna 32 may be any type of antenna capable of transmitting and receiving data and/or signals wirelessly. In some embodiments, the antenna 32 may comprise one or more omni-directional, sector, or panel antennas operable to transmit/receive radio signals. For simplicity, the antenna 32 may be considered a part of the interface 30 to the extent that a wireless signal is being used.

Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Any appropriate steps, methods, or functions may be performed through a computer program product that may, for example, be executed by the components and equipment illustrated in FIG. 3. For example, the storage 20 may comprise computer readable means on which a computer program can be stored. The computer program may include instructions which cause the processor 18 (and any operatively coupled entities and devices, such as the interface 22 and the storage 20) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by the processors 26 and/or 18, possibly in cooperation with the storage 28 and/or 20. The processors 26 and/or 18 and the storage 28 and/or 20 may thus be arranged to allow the processors 26 and/or 18 to fetch instructions from the storage 28 and/or 20 and execute the fetched instructions to allow the respective functional module to perform any steps or functions disclosed herein.

Figure 4:
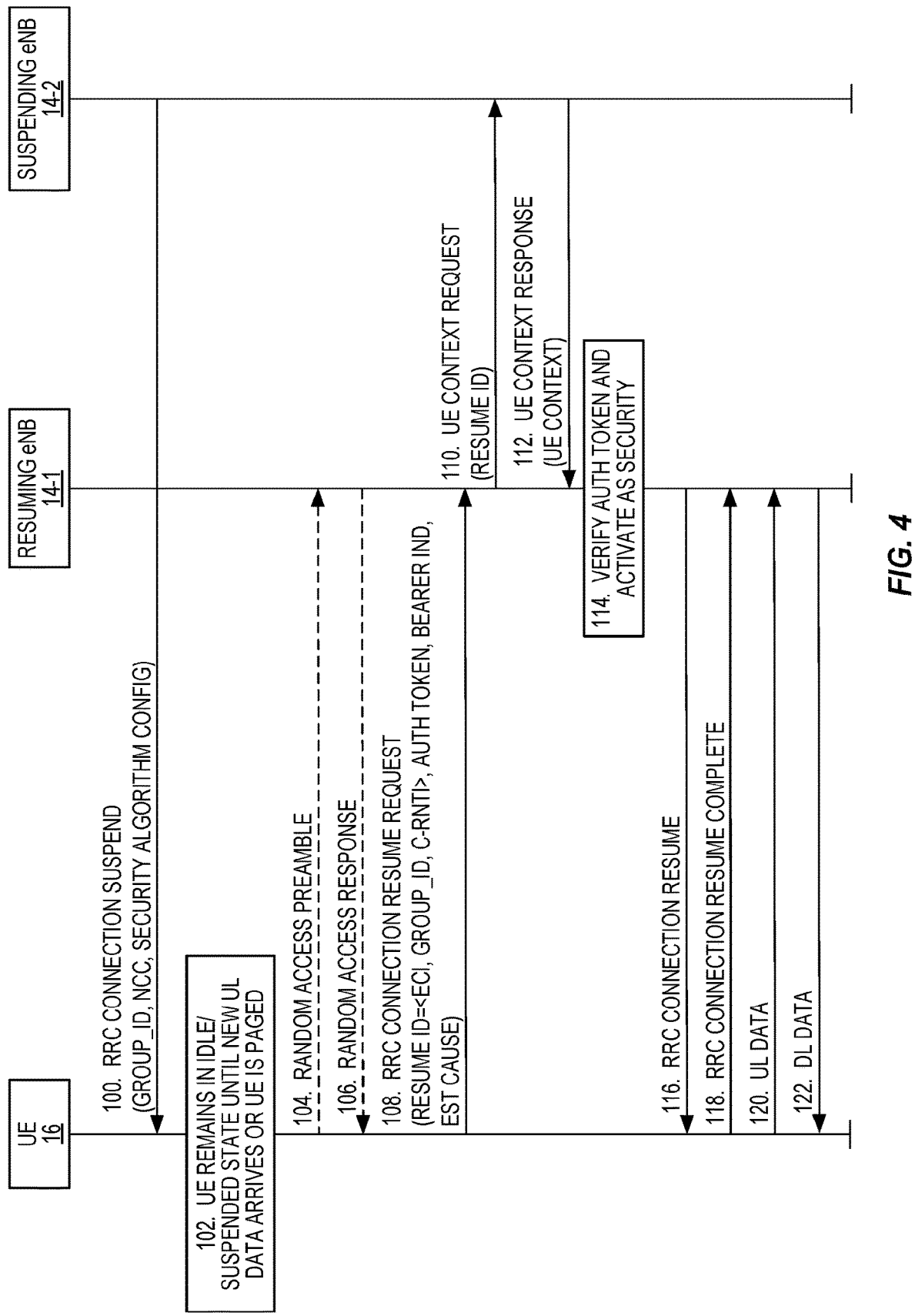
FIG. 4 is a signaling diagram that illustrates the operation of the wireless network of FIG. 3 according to some embodiments of the present disclosure.

A description is provided below of the basic steps performed in the wireless device 16, the network node 14 (referred to herein as the suspending network node) suspending a connection of the wireless device 16 to the radio access network, and the network node 14 (referred to herein as the resuming network node) resuming the connection of the wireless device 16 to the radio access network. In this following example, the wireless network 10 is a Third Generation Partnership Project (3GPP) LTE or future variation thereof and, as such, 3GPP terminology is used. Therefore, the wireless device 16 is referred to as UE 16, the suspending network node 14 is referred to as the suspending eNB 14, and the resuming network node 14 is referred to as the resuming eNB 14. Further, in the following example, the eNB 14-1 is the resuming eNB, and the eNB 14-2 is the suspending eNB. The description is made with reference to the signaling diagram in FIG. 4.

The UE 16 has an established RRC connection with a source eNB 14-2. Due to some trigger (e.g., expiry of an UE inactivity timer), the source eNB 14-2 decides to suspend the RRC connection by sending a RRC Connection Suspend message to the UE 16 (step 100). The eNB 14-2 is therefore referred to as the suspending eNB 14-2. The UE 16 stores its UE context and transitions to IDLE/SUSPENDED state upon receiving the RRC Connection Suspend message. Various triggers may be envisioned that would cause the eNB 14-2 to suspend the RRC connection. The RRC Connection Suspend message may contain security related parameters (e.g., Next Hop Chaining Counter (NCC) and security algorithm configuration) which are required when Access Stratum (AS) security is later re-established. This information is stored by the UE 16 in addition to its UE context.

If the cell served by the suspending eNB 14-2 is large and contains many suspended UEs, the suspending eNB 14-2 can assign a GROUP_ID to increase the number of addressable UE contexts. The GROUP_ID is either included in the RRC Connection Suspend message or the GROUP_ID is sent to the UE 16 when the RRC connection was initially established, e.g. in the second step of the RRC Connection Establishment procedure. In case the GROUP_ID is sent to the UE 16 during the connection establishment procedure, the GROUP_ID may also be included, or sent, in the RRC Connection Resume message to allow for change of the GROUP_ID to ensure that the combination of the GROUP_ID and the UE identity within the new cell (i.e., the cell in which the RRC connection is subsequently resumed) is unique within the new cell; i.e., not used for any other UE in the new cell.

The UE 16 remains in IDLE/SUSPENDED state until new uplink (UL) data arrives (i.e., new data arrives in the uplink buffer of the UE 16) or the UE 16 is paged (step 102). At some later point in time, new data arrives in the uplink buffer at the UE 16 or the UE 16 is being paged by the network 12. This, or any other activity that would require a connection with the UE 16, triggers the UE 16 to resume the RRC connection. Optionally, in some scenarios, the UE 16 performs a random access procedure in which the UE 16 transmits a random access preamble (step 104) and, in response, receives a random access response from the eNB 14-1 (step 106). The UE 16 resumes its RRC connection by sending an RRC Connection Resume Request message to the eNB 14-1, which is referred to as the target or resuming eNB (step 108). The UE 16 includes its Resume ID and an authorization token in the RRC Connection Resume Request message.

As discussed above, the Resume ID is made up of two or three parts, depending on the embodiment. One part identifies the eNB and cell and another part identifies the suspended UE within a cell. In some embodiments, the Resume ID includes another part that is a group identifier. In some particular embodiments, the Resume ID is a composite identifier made up of the following sub-parts:

ECI. The ECI is 28 bits long and is broadcasted in SIB1 of the suspending cell. It can be used to uniquely identify an eNB and cell within a Public Land Mobile Network (PLMN).

C-RNTI. The C-RNTI is 16 bits long and is assigned by the suspending cell during the random access procedure.

GROUP_ID. GROUP_ID is a new identifier which is used to expand the address space if the 16 bit C-RNTI is not sufficient. It is assigned to the UE 16 by the suspending eNB 14-2 as explained in step 100.

The resuming eNB 14-1 locates the suspending eNB 14-2 based on the ECI and sends a request to retrieve the UE context associated with the UE 16 (step 110). The UE context request includes the Resume ID of the UE 16. In some alternative embodiments, rather than including the full Resume ID, the UE context request may include the C-RNTI and, if included, the GROUP_ID of the UE 16.

The suspending eNB 14-2 retrieves the UE context associated with the C-RNTI and GROUP_ID (if present) and sends the UE context to the resuming eNB 14-1 (step 112). The UE context response also includes the AS security key, the security algorithm configuration, and the authorization token.

In case no UE context is found, the suspending eNB 14-2 responds with an error message indicating that the Resume ID is missing.

If the UE context was found, the resuming eNB 14-1 verifies the authorization token received from the UE 16 in the RRC Connection Resume Request message by matching it to the authorization token received from the suspending eNB 14-2 (step 114). Next, the resuming eNB 14-1 activates AS security using the AS security key and the security algorithm configuration received from the suspending eNB 14-2 (step 114).

The resuming eNB 14-1 sends a RRC Connection Resume message to the UE 16 to indicate that the connection is being resumed (step 116).

Note that contention resolution may also be performed as part of this step. In case multiple UEs perform random access at the same time and select the same preamble, they will all receive the same random access response and will therefore use the same resources for the uplink transmission. In this case, the eNB will receive multiple RRC Connection Resume Request messages but it may only be able to decode and respond to one of them. In order for a UE to be able to determine which UE the eNB actually responded to, the eNB includes a copy of the RRC Connection Resume Request in its response. Only a UE which observes a match between the received and transmitted message, i.e., the RRC Connection Resume Request, will declare the random access procedure successful. Thus, in order determine whether there is a match, the UE 16 compares the copy of the RRC Connection Resume Request included in the RRC Connection Resume message to a local copy of the RRC Connection Resume Request for purposes of contention resolution. If there is a match between the received copy and the local copy, then the UE 16 will declare the random access procedure successful. Since the RRC Connection Resume Request contains the Resume ID which is unique among UEs, only one UE will be successful. The other UEs will restart from the beginning.

Contention resolution could be performed by the Medium Access Control (MAC) layer in the same way as is done today for RRC connection establishment/re-establishment, i.e. the copy of the RRC Connection Resume Request is transmitted in the contention resolution identity MAC control element. One problem though is that the size of this control element is fixed to 48 bits which is less than the size of the RRC Connection Resume Request. There are two primary options for handling this problem:

Introduce a new contention resolution identity MAC control element with a larger size; and Use the existing contention resolution identity MAC control element but only parts of the content from RRC Connection Resume Request message is copied (e.g., the C-RNTI, GROUP-ID (if needed), and authorization token). Thus, at the UE 16, the UE 16 will declare the random access procedure successful if there is a match between the portion of the RRC Connection Resume Request message included in the RRC Connection Resume message and a local copy of that portion of the RRC Connection Resume Request.

In the latter case, the contention resolution identity may no longer be unique and there is a small risk that contention resolution succeeds for more than one UE. However, since AS security is activated and only the UE with the correct key will be able to decipher and verify the integrity of subsequent messages, this situation can be detected and resolved.

Copying parts of the content from the RRC Connection Resume Request message can be done, e.g.:

by including only specific information elements and/or parts of information elements; or by copying the first part of the RRC Connection Resume message, comprising identification of the RRC message type, and specific information elements and/or parts of information elements; or by truncation of the RRC Connection Resume Request message (Service Data Unit (SDU) from the Common Control Channel (CCCH)) to the size of the existing contention resolution identity MAC control element (i.e., 48 bits in legacy LTE).

By truncating the SDU from CCCH, the message type included in the RRC message is kept, and it can be ensured that the contention resolution identities for legacy RRC Connection Request, RRC Connection Reestablishment Request, and RRC Connection Resume Request can be distinguished by means of the message type of the UL-CCCH included in the RRC message. Hence, in the case truncated SDU from CCCH is used as contention resolution identity, ambiguity is avoided for legacy UEs which do not implement or understand the new functionality; i.e., legacy UEs can be kept unaffected. In case the truncated SDU from CCCH would no longer present a unique contention resolution identity among UEs attempting to resume RRC Connections, conflict can be detected and resolved by verification of AS integrity as described above. The risk of conflicts can be reduced by arranging the information included in the RRC Connection Resume Request in an order such that entropy in the contention resolution identity MAC control element becomes high; i.e., unlikely that more than one UE uses the same contention resolution identity at the same time in the same cell. In an exemplary arrangement of the information in the Resume ID, the first part can be C-RNTI followed by GROUP_ID (if GROUP_ID is needed/used) and ECI. To further increase entropy in the contention resolution identity MAC control element, e.g., in case it is based on a truncated RRC Connection Resume message, the bit orders in the C-RNTI, GROUP_ID, and ECI parts can be reversed so that, e.g., the cell identity part of ECI comes before the eNB part of ECI. Reversing the bit order of the C-RNTI and GROUP_ID parts is assuming that they are allocated incrementally and the distribution is biased towards smaller values. Alternatively to reversing bit orders of C-RNTI and GROUP_ID, the allocation algorithm can be adapted to achieve the same result.

The UE may acknowledge the reception by sending a RRC Connection Resume Complete message (step 118). Note that step 118 is optional. The UE 16 is then in the RRC CONNECTED state and may then transmit uplink data (step 120) and receive downlink data (step 122) using the resumed RRC connection.

In the description above, it is assumed that the suspending eNB 14-2 is different from the resuming eNB 14-1, i.e., inter-eNB RRC resume is assumed. In case the suspending and resuming eNBs 14 are identical, or the same eNB 14, i.e., assuming an intra-eNB RRC resume, the procedure is the same except that steps 110 and 112 are performed internally in the eNB 14.

Certain aspects of the present disclosure have mainly been described above with reference to a few embodiments. However, as is readily appreciated by a person skilled in the art, embodiments other than the ones disclosed above are equally possible and within the scope of the present disclosure and the concepts disclosed herein. Similarly, while a number of different combinations have been discussed, all possible combinations have not been disclosed. One skilled in the art would appreciate that other combinations exist and are within the scope of the present disclosure. Moreover, as is understood by the skilled person, the herein disclosed embodiments are as such applicable also to other standards and communication systems and any feature from a particular figure disclosed in connection with other features may be applicable to any other figure and or combined with different features.

As discussed above, any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by the processors 26 and/or 18, possibly in cooperation with the storage 28 and/or 20. The processors 26 and/or 18 and the storage 28 and/or 20 may thus be arranged to allow the processors 26 and/or 18 to fetch instructions from the storage 28 and/or 20 and execute the fetched instructions to allow the respective functional module to perform any steps or functions disclosed herein.

Figure 5:
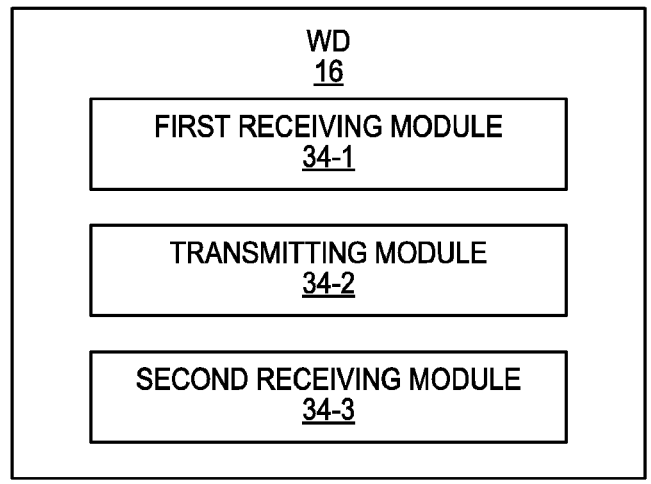
FIG. 5 illustrates an example of a wireless device (e.g., a UE) according to some other embodiments of the present disclosure.
Figure 6:
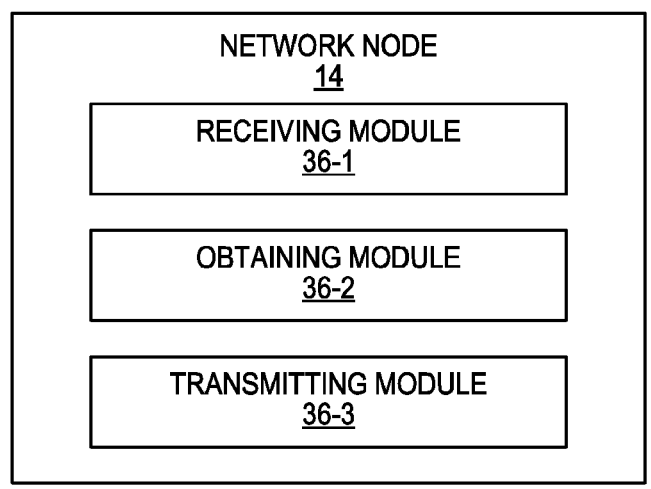
FIGS. 6 and 7 illustrate examples of a network node (e.g., a base station) according to some other embodiments of the present disclosure.
Figure 7:
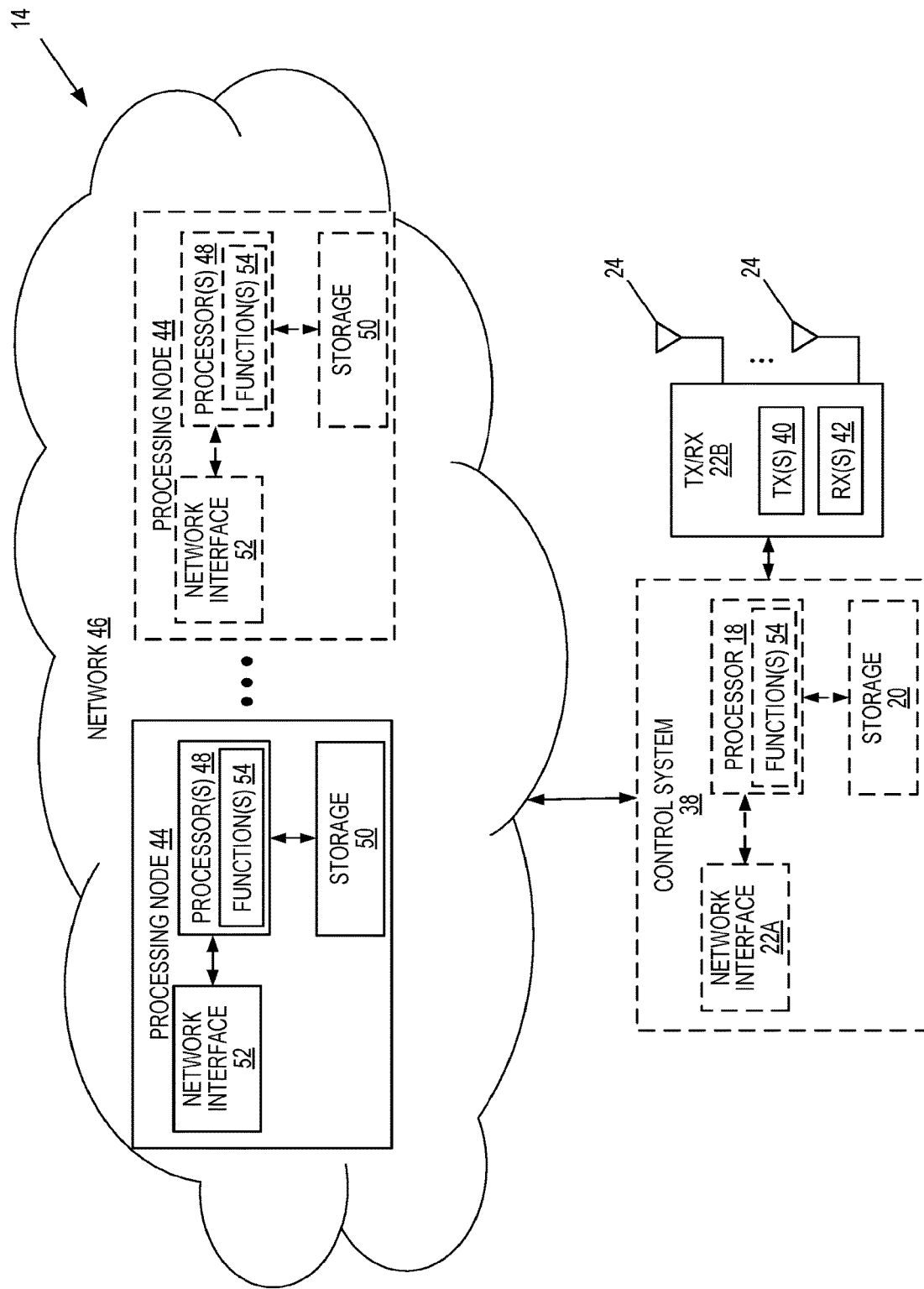

In this regard, FIGS. 5 through 7 illustrate example embodiments of the wireless device 16 and the network node 14. As illustrated in FIG. 5, in this example, the wireless device 16 includes a first receiving module 34-1, a transmitting module 34-2, and a second receiving module 34-3. The first receiving module 34-1 is operable to receive, from a first network node 14, a first message that instructs the wireless device 16 to suspend a connection between the wireless device 16 and the wireless network 10. Upon receiving the first message, the wireless device 16 stores a wireless device context (i.e., a UE context) of the wireless device 16 and enters a suspended mode of operation. The transmitting module 34-2 is operable to, upon an occurrence of a triggering event, transmit, to a second network node 14, a second message that requests that the connection between the wireless device 16 and the wireless network 16 be resumed. The second message includes a resume identifier, where the resume identifier includes a part that identifies the first network node 14 to which the wireless device 16 was connected upon suspending the connection and a part that identifies the wireless device 16. The second receiving module 34-3 is operable to receive, from the second network node 14, a third message that indicates that the connection between the wireless device 16 and the wireless network 10 is being resumed using the stored wireless device context of the wireless device 16.

As illustrated in FIG. 6, in this example, the network node 14 includes a receiving module 36-1, an obtaining module 36-2, and a transmitting module 36-3. The receiving module 36-1 is operable to receive, from a wireless device 16, a first message that requests that a connection between the wireless device 16 and the wireless network 10 be resumed. The first message includes a resume identifier, where the resume identifier includes a part that identifies a network node 14 and cell to which the wireless device 16 was connected upon suspending the connection and a part that identifies the wireless device 16 within the cell. The obtaining module 36-2 is operable to obtain, from the network node 14 identified by the resume identifier, a wireless device context of the wireless device 16 previously stored upon suspending the connection between the wireless device 16 and the wireless network 10. The transmitting module 36-3 is operable to transmit, to the wireless device 16, a second message that indicates that the connection between the wireless device 16 and the wireless network 10 is being resumed using the stored wireless device context of the wireless device 16.

FIG. 7 is a schematic block diagram that illustrates a virtualized embodiment of the base station 14 according to some embodiments of the present disclosure. Other types of network nodes may have similar architectures (particularly with respect to including processor(s), memory, and a network interface).

As used herein, a "virtualized" base station 14 is a base station 14 in which at least a portion of the functionality of the base station 14 is implemented as a virtual component (e.g., via a virtual machine(s) executing on a physical processing node(s) in a network(s)). As illustrated, the base station 14 optionally includes a control system 38 that includes the processor 18, the storage 20, and the network interface 22A, as described above. The base station 14 also includes a transceiver 22B, which may also be referred to as a radio interface, that includes one or more transmitters 40 and one or more receivers 42 coupled to a number of antennas 24. The control system 38 (if present) is connected to the transceiver 22B via, for example, an optical cable or the like. The control system 38 (if present) is connected to one or more processing nodes 44 coupled to or included as part of a network(s) 46 via the network interface 22A. Alternatively, if the control system 38 is not present, the transceiver 22B is connected to the one or more processing nodes 44 via a network interface(s). Each processing node 44 includes one or more processors 48 (e.g., CPUs, ASICs, FPGAs, and/or the like), storage 50 (e.g., memory), and a network interface 52.

In this example, functions 54 of the base station 14 described herein are implemented at the one or more processing nodes 44 or distributed across the control system 38 (if present) and the one or more processing nodes 44 in any desired manner. In some particular embodiments, some or all of the functions 54 of the base station 14 described herein are implemented as virtual components executed by one or more virtual machines implemented in a virtual environment(s) hosted by the processing node(s) 44. As will be appreciated by one of ordinary skill in the art, additional signaling or communication between the processing node(s) 44 and the control system 38 (if present) or alternatively the transceiver 22B is used in order to carry out at least some of the desired functions. Notably, in some embodiments, the control system 38 may not be included, in which case the transceiver 22B communicates directly with the processing node(s) 44 via an appropriate network interface(s).

The following acronyms are used throughout this disclosure.

3GPP Third Generation Partnership Project
AS Access Stratum
ASIC Application Specific Integrated Circuit
BSC Base Station Controller
BTS Base Transceiver Station
CCCH Common Control Channel
CPU Central Processing Unit
C-RNTI Cell Radio Network Temporary Identifier
ECI Evolved Universal Terrestrial Radio Access Network Cell Identifier
eNB Enhanced or Evolved Node B
E-UTRAN Evolved Universal Terrestrial Radio Access Network FPGA Field Programmable Gate Array
ID Identifier
IP Internet Protocol
LAN Local Area Network
LTE Long Term Evolution
MAC Medium Access Control
MTC Machine Type Communication
NCC Next Hop Chaining Counter
PDA Personal Digital Assistant
PLMN Public Land Mobile Network
PSTN Public Switched Telephone Network
RAM Random Access Memory
RAT Radio Access Technology
RNC Radio Network Controller
ROM Read-Only Memory
RRC Radio Resource Control
SDU Service Data Unit
SIB System Information Block
UE User Equipment
VoIP Voice over Internet Protocol
WAN Wide Area Network
WD Wireless Device
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device, comprising:
receiving, from a wireless network, a first message that indicates to suspend a connection between the wireless device and the wireless network;
responsive to receiving the first message, storing a wireless device context and entering a suspended mode of operation;
upon an occurrence of a triggering event, transmitting, to the wireless network, a second message that requests to resume the connection between the wireless device and the wireless network, wherein the second message comprises a resume identifier including: an identifier of a network node; and an identifier of the wireless device; and
receiving, from the wireless network, a contention resolution identity Medium Access Control (MAC) control element that includes a portion of the second message, wherein the portion of the second message is a truncated second message, truncated to a number of bits that is equal in size of the contention resolution identity MAC control element.

2. The method of claim 1, wherein the portion of the second message that is received from the wireless network corresponds to the resume identifier.

3. The method of claim 1, further comprising:
performing contention resolution by matching the resume identifier with the portion of the second message.

4. The method of claim 1, wherein the size of the contention resolution identity MAC control element is 48 bits.

5. The method of claim 1, wherein the portion of the second message is transmitted in an uplink common control channel service data unit.

6. The method of claim 1, wherein the second message comprises an RRC Connection Resume Request.

7. The method of claim 1, wherein the second message is transmitted in an uplink common control channel service data unit.

8. The method of claim 1, wherein the contention resolution identity MAC control element is associated with a third message that indicates that the connection between the wireless device and the wireless network is to be resumed.

9. The method of claim 1, wherein the stored wireless device context is used for resuming the connection.

10. A wireless device, comprising:
a non-transitory memory; and
one or more hardware processors coupled to the non-transitory memory and configured to read instructions from the non-transitory memory to cause the wireless device to perform operations comprising:
receiving, from a wireless network, a first message that indicates to suspend a connection between the wireless device and the wireless network;
responsive to receiving the first message, storing a wireless device context and entering a suspended mode of operation;
upon an occurrence of a triggering event, transmitting, to the wireless network, a second message that requests to resume the connection between the wireless device and the wireless network, wherein the second message comprises a resume identifier including: an identifier of a network node; and an identifier of the wireless device; and
receiving, from the wireless network, a contention resolution identity Medium Access Control (MAC) control element that includes a portion of the second message, wherein the portion of the second message is a truncated second message, truncated to a number of bits that is equal in size of the contention resolution identity MAC control element.

11. The wireless device of claim 10, wherein the portion of the second message that is received from the wireless network corresponds to the resume identifier.

12. The wireless device of claim 10, the operations further comprising: performing contention resolution by matching the resume identifier with the portion of the second message.

13. The wireless device of claim 10, wherein the size of the contention resolution identity MAC control element is 48 bits.

14. The wireless device of claim 10, wherein the portion of the second message is transmitted in an uplink common control channel service data unit.

15. The wireless device of claim 10, wherein the contention resolution identity MAC control element is associated with a third message that indicates that the connection between the wireless device and the wireless network is to be resumed.

16. The wireless device of claim 10, wherein the stored wireless device context is used for resuming the connection.

17. A method of operation of a network node, comprising:
providing, to a wireless device, a first message that indicates to suspend a connection between the wireless device and the network node;
upon an occurrence of a triggering event, receiving, from the wireless device, a second message that requests to resume the connection between the wireless device and the network node, wherein the second message comprises a resume identifier including: an identifier of the network node; and an identifier of the wireless device; and
providing, to the wireless device, a contention resolution identity Medium Access Control (MAC) control element that includes a portion of the second message, wherein the portion of the second message is a truncated second message, truncated to a number of bits that is equal in size of the contention resolution identity MAC control element.

18. The method of claim 17, wherein the portion of the second message that is received from the wireless device corresponds to the resume identifier.

19. The method of claim 17, wherein the size of the contention resolution identity MAC control element is 48 bits.

20. The method of claim 17, wherein the portion of the second message is received in an uplink common control channel service data unit.

21. The method of claim 17, wherein the second message comprises an RRC Connection Resume Request.

22. The method of claim 17, wherein the second message is received in an uplink common control channel service data unit.

23. The method of claim 17, wherein the contention resolution identity MAC control element is associated with a third message that indicates that the connection between the wireless device and the network node is to be resumed.

24. A network node, comprising:
a non-transitory memory; and
one or more hardware processors coupled to the non-transitory memory and configured to read instructions from the non-transitory memory to cause the network node to perform operations comprising:
providing, to a wireless device, a first message that indicates to suspend a connection between the wireless device and the network node;
upon an occurrence of a triggering event, receiving, from the wireless device, a second message that requests to resume the connection between the wireless device and the network node, wherein the second message comprises a resume identifier including:
an identifier of the network node; and an identifier of the wireless device; and
providing, to the wireless device, a contention resolution identity Medium Access Control (MAC) control element that includes a portion of the second message, wherein the portion of the second message is a truncated second message, truncated to a number of bits that is equal in size of the contention resolution identity MAC control element.

25. The network node of claim 24, wherein the portion of the second message that is received from the wireless device corresponds to the resume identifier.

26. The network node of claim 24, wherein the size of the contention resolution identity MAC control element is 48 bits.

27. The network node of claim 24, wherein the portion of the second message is received in an uplink common control channel service data unit.

28. The network node of claim 24, wherein the second message comprises an RRC Connection Resume Request.

29. The network node of claim 24, wherein the second message is received in an uplink common control channel service data unit.

30. The network node of claim 24, wherein the contention resolution identity MAC control element is associated with a third message that indicates that the connection between the wireless device and the network node is to be resumed.

* * * * *

UNITED STATES PATENT AND TRADEMARK OFFICE
CERTIFICATE OF CORRECTION

Page 1 of 1

PATENT NO. : 12,219,647 B2
APPLICATION NO. : 18/141489
DATED : February 4, 2025
INVENTOR(S) : Ohlsson et al.

It is certified that error appears in the above-identified patent and that said Letters Patent is hereby corrected as shown below:

In the Claims

In Column 21, Line 5, in Claim 18, delete "received from" and insert -- provided to --, therefor.

Signed and Sealed this
Sixteenth Day of September, 2025

Coke Morgan Stewart
*Acting Director of the United States Patent and Trademark Office*